No. 783,797. Patented February 28, 1905.

UNITED STATES PATENT OFFICE.

SHELDON NORTON, OF WATERVLIET, NEW YORK.

MAKING FIRE-BRICK.

SPECIFICATION forming part of Letters Patent No. 783,797, dated February 28, 1905.

Application filed January 14, 1903. Serial No. 139,052.

*To all whom it may concern:*

Be it known that I, SHELDON NORTON, a citizen of the United States, residing at Watervliet, county of Albany, and State of New York, have invented certain new and useful Improvements in Making Fire-Bricks, of which the following is a specification.

The object of my invention is to cheaply produce a strong, light, and durable fire-brick or the like for fireproofing purposes.

My invention in its preferred form consists in utilizing the slag of blast-furnaces, ordinarily a waste product, by mixing with it when tempered and granulated an hydraulic cement, such as Portland cement, then grinding the mixture, forming it into a paste by the addition of water, molding, piling, and sprinkling it from day to day until set to the required degree of hardness, as hereinafter more fully described, and subsequently claimed.

The slag which comes from the ordinary blast-furnace for treating iron ores has been subjected to a very high degree of heat sufficient to flux and remove such fluxible materials as lime, magnesia, potash, and metallic oxids, leaving a fireproof material well adapted to form the principal ingredient of hollow fire-bricks for fireproofing buildings, and such slag when granulated and tempered by running the same into water possesses certain hydraulic properties which well adapt it to the formation by hydration of a hard and durable stone-like substance, and by the association therewith in powdered form of an ingredient capable of accelerating such hydraulic action or hydration I have ascertained that the use of such slag is rendered practicable for the manufacture of fireproofing material. This can be done by incorporating with the powdered slag a small percentage of hydraulic cement, such as Portland. The hydraulic cement has been subjected to a very high temperature during its manufacture, and the mixture remains practically fireproof. The mixture can also be transformed into hard and strong tubular bricks without the expensive burning process, it only being necessary to pile up the green bricks under a cover which will protect them from the elements and sprinkle them with water from day to day until they set and harden sufficiently for building purposes.

In practicing this improved method the slag as it comes from the furnace is granulated by running it into water. The granulated slag is then dried and ground with a small quantity of Portland cement, which may be from two to ten per cent. of the mixture, depending upon the character of fireproofing desired. The larger the per cent. of cement within the above limits the harder and stronger will the finished product become. Water is then mixed with the dry powder which results from the grinding operation to form a thick paste, which is put into the desired form by any of the well-known machines or mechanisms heretofore used for like purposes. The green bricks are piled up under cover, where they are sprinkled with water from day to day until set to the required degree of hardness. They may be sprinkled once a day for three or four weeks with good effect.

What I claim as new, and desire to secure by Letters Patent, is—

1. That improvement in the art of making fireproofing and the like, which consists in tempering, granulating and imparting hydraulicity to blast-furnace slag by running the same while molten into water; reducing the tempered and granulated slag to powdered form; mixing a small percentage of hydraulic cement with such powdered slag to accelerate hydration, forming a thick paste by the addition of water to the mixture, molding the paste into desired form, and imparting to the molded article the required degree of hardness by the application of water.

2. That improvement in the art of making fireproofing and the like, which consists in drying granulated blast-furnace slag, mixing therewith a small percentage of hydraulic cement, reducing the dry mixture to a powder by grinding, forming a stiff paste by the addition of water to the dry mixture, molding the paste into the desired forms, piling the green bricks under cover and sprinkling them from day to day with water, until they have set to the required degree of hardness.

3. Fireproofing material formed from tempered, granulated and powdered blast-furnace slag mixed with a small percentage of hydraulic cement and water, and hardened by the application of water, substantially as described.

In testimony whereof I have hereunto set my hand this 31st day of December, 1902.

SHELDON NORTON.

Witnesses:
FRANK C. CURTIS,
E. M. O'REILLY.